UNITED STATES PATENT OFFICE.

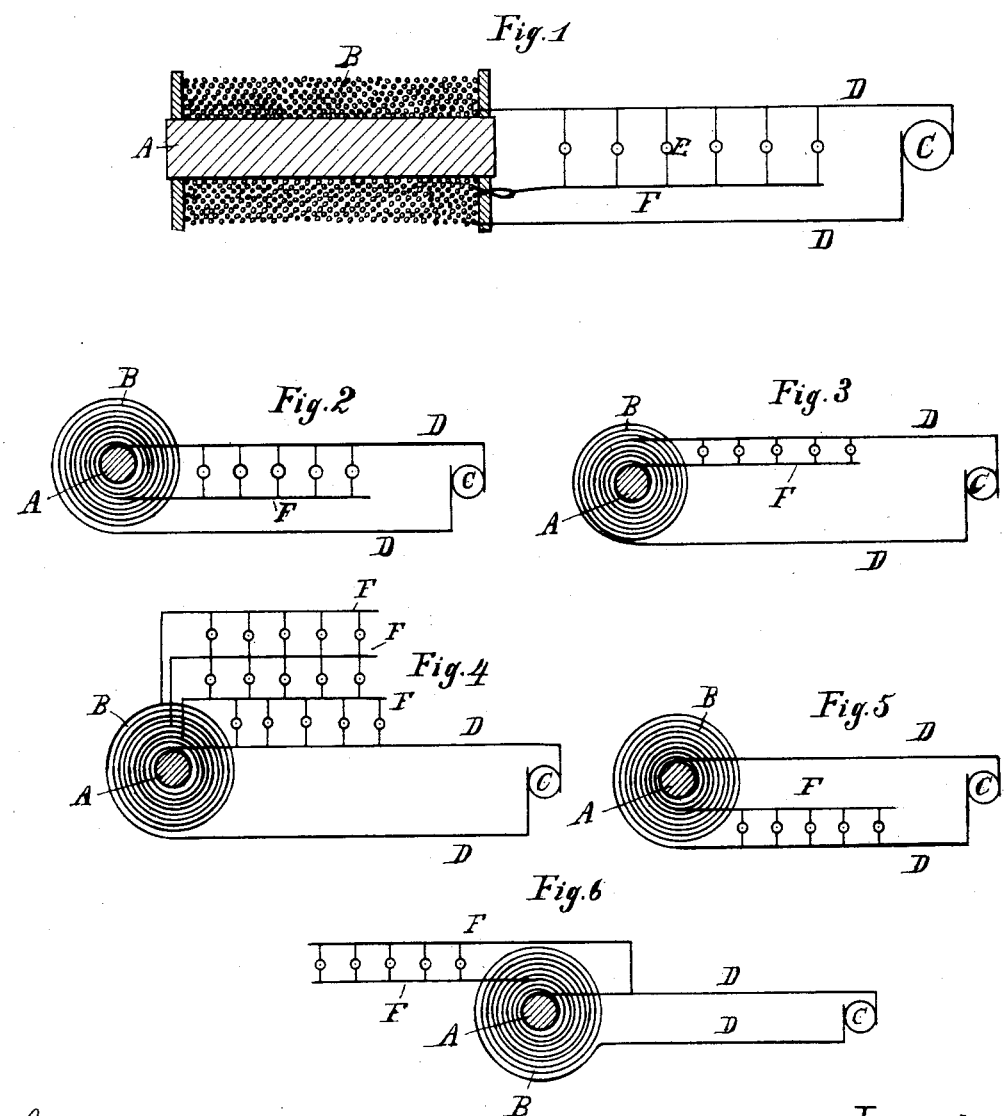

THOMAS H. HICKS, OF DETROIT, MICHIGAN, ASSIGNOR TO THE HICKS INDUCTION-LIGHT AND MOTOR COMPANY, OF MICHIGAN.

SYSTEM OF ELECTRICAL DISTRIBUTION AND CONVERSION.

SPECIFICATION forming part of Letters Patent No. 402,671, dated May 7, 1889.

Application filed July 5, 1888. Serial No. 279,129. (No model.)

*To all whom it may concern:*

Be it known that I, THOMAS H. HICKS, a citizen of Great Britain, residing at Detroit, in the county of Wayne and State of Michigan, have invented certain new and useful Improvements in Induction-Coils, of which the following is a specification, reference being had therein to the accompanying drawings.

This invention relates to new and useful improvements in systems of electrical distribution and conversion, whereby pulsating or intermittent currents of electricity of high tension are converted into low-tension currents, suitable for electric light or electric motors; and the invention consists in the peculiar arrangement of an inductorium, and its combination with a main and translating circuit, all as more fully hereinafter described, and shown in the accompanying drawings, in which—

Figure 1 is a vertical central longitudinal section of the inductorium. Figs. 2, 3, 4, and 5 are diagram cross-sections thereof, with the translating devices differently disposed in each figure, as specifically referred to hereinafter.

A is an iron core of any ordinary construction.

B is a coil formed of a single-wire conductor, wound back and forth upon the core to form a series of superimposed helices, as in the usual manner of forming such coils.

C is an electric generator of pulsating or intermittent currents.

D D is the main-line circuit leading from the generator to the coil, and including either the whole coil, as shown in Figs. 1, 2, 4, 5, and 6, or only a portion of its helices, as shown in Fig. 3.

E are translating devices placed in multiple arc, with a portion or portions of the helices of the coil in one or more working-circuits, F, which may be variously arranged, as shown in the different figures, in which Figs. 1, 2, and 3 show a working-circuit including an inner section of the coil, while Figs. 5 and 6 show a working-circuit including an outer portion of the coil, while Fig. 4 shows three working-circuits including successive sections of the coil.

In practice it will be seen that the current from the generator has two ways to pass—one through the main line and the other through the working-circuit, the amount passing through the latter being proportioned to the resistance in said circuit. At the same time, the coils or section of coils of each circuit being in the same magnetic field with each other, a corresponding induced current will be thrown into the working-circuit when the main current is off, and the induced current will also pass through the working-circuit. Each wave or impulse of current passing through the several branch circuits from the dynamo-machine excites magnetism in the core A of the induction-coil B, and the lines of force in spreading through the magnetic field thus created cut the coil-conductor surrounding the core, thus creating an electro-motive force which will send an induced current through any path or circuit that may be closed to it at that moment. When the brushes change commutator-segments, there will be a rupture of the path through the dynamo, and the induced wave in coil B, due to the break of current, must discharge through the circuit containing the translating devices. It will thus be evident that in the case of a direct current the induction-coil renders the current smoother by bridging over the intervals due to the insulations between the commutator-segments. In the several figures of the drawings more or less of the induction-coil is thrown into the circuit containing the translating devices. The dynamo-current at all times has one branch which passes through the entire coil. The electro-magnet B thus forms a reaction-coil, which, during the intermissions of current between the successive pulsations, supplies the translating devices.

What I claim as my invention is—

In a system of electrical distribution and conversion, the combination of a source of high-tension intermittent electrical impulses of one direction, a main circuit connected thereto, a derived local circuit containing translating devices, and a reaction-coil having all or a portion of its helices in the main circuit and a portion in the local circuit, both portions being in the same magnetic field.

In testimony whereof I affix my signature, in presence of two witnesses, this 7th day of June, 1888.

THOS. H. HICKS.

Witnesses:
JOHN SCHUMAN,
P. M. HULBERT.